(12) United States Patent
Koivusalmi et al.

(10) Patent No.: US 7,501,546 B2
(45) Date of Patent: Mar. 10, 2009

(54) PROCESS FOR PRODUCING A BRANCHED HYDROCARBON COMPONENT

(75) Inventors: Eija Koivusalmi, Kulloonkylä (FI); Juha Moilanen, Porvoo (FI)

(73) Assignee: Neste Oil Oj (FI)

( * ) Notice: Subject to any disclaimer, the term of this patent is extended or adjusted under 35 U.S.C. 154(b) by 0 days.

(21) Appl. No.: 11/636,502

(22) Filed: Dec. 11, 2006

(65) Prior Publication Data

US 2007/0135666 A1 Jun. 14, 2007

Related U.S. Application Data

(60) Provisional application No. 60/749,034, filed on Dec. 12, 2005.

(51) Int. Cl.
    *C07C 1/207* (2006.01)
(52) U.S. Cl. .............. 585/327; 585/328; 585/316; 585/733
(58) Field of Classification Search .......... 585/327, 585/328, 316, 733
    See application file for complete search history.

(56) References Cited

U.S. PATENT DOCUMENTS

| | | |
|---|---|---|
| 3,501,546 A | 3/1970 | Dubeck |
| 4,026,960 A | 5/1977 | Nishida |
| 4,317,948 A | 3/1982 | Heckelsberg |
| 4,457,944 A | 7/1984 | Conrad et al. |
| 5,516,960 A | 5/1996 | Robinson |
| 5,777,183 A | 7/1998 | Mueller et al. |
| 6,683,224 B1 | 1/2004 | Hourticolon et al. |
| 2002/0117424 A1 | 8/2002 | Drake et al. |
| 2004/0053796 A1 | 3/2004 | O'Rear |
| 2004/0230085 A1 | 11/2004 | Jakkula |

FOREIGN PATENT DOCUMENTS

| | | |
|---|---|---|
| DE | 33 40 711 | 9/1984 |
| DE | 39 11 004 | 11/1990 |
| DE | 33407111 A1 | 9/2004 |
| EP | 0 209 997 | 1/1987 |
| EP | 1 1681 337 | 7/2006 |
| FI | 100248 B | 10/1997 |
| GB | 175974 | 6/1923 |
| JP | 01056792 | 3/1989 |
| WO | WO 2004/062763 | 7/2004 |

OTHER PUBLICATIONS

Schaper, U.-A., "Die gemischte Guerbet-Reaktion zwischen cyclishen und acyclischen Alkoholen," Fette, Seifen, Anstrichmittel, 1980, vol. 82, No. 11, 454-456.

(Continued)

*Primary Examiner*—Thuan Dinh Dang
(74) *Attorney, Agent, or Firm*—Birch Stewart Kolasch & Birch, LLP (57) ABSTRACT

The invention relates to a process for producing high-quality hydrocarbon base oil of biological origin. The process of the invention comprises alcohol condensation, hydrodeoxygenation, and isomerization steps. Alcohols, preferably fatty alcohols of biological origin are used as the feedstock.

17 Claims, 2 Drawing Sheets

OTHER PUBLICATIONS

Ulmanns, Encykolpadie der technischen Chemie, 4., neubearbeitete und erweiterte Auflage, Band 13, (1976), Verlag Chemie GmbH, Weinheim, p. 146.

Schaper, "Die gemischte Guerbet-Reaktion Zwischen cyclischen und acyclischen Alkoholen", *Fette, Seifen, Anstrichmittel*, vol. 82 (1980), No. 11, pp. 454-456.

English Translation of Finnish Patent Office Search Report for Finnish Patent Application No. FI200556663.

English Translation of Finnish Patent Office Search Report for Finnish Patent Application No. FI200556663, dated of the reference Apr. 28, 2006.

Cui, S. T., et al., Nonequilibrium molecular dynamics simulation of the rheology of linear and branched alkanes, International Journal of Thermophysics, (1998), vol. 19, pp. 449-459.

Notification of Transmittal of the International Search Report and the Written Opinion of the International Searching Authority dated Jun. 19, 2007 for PCT Application FI2006/050549.

PROCESS FOR PRODUCING A BRANCHED HYDROCARBON COMPONENT

This Non-provisional application claims priority under 35 U.S.C. § 119(e) on U.S. Provisional Application No(s). 60/749,034 filed on Dec. 12, 2005, the entire contents of which are hereby incorporated by reference.

TECHNICAL FIELD

The invention relates to a process for producing a hydrocarbon component, and particularly a process for producing high-quality branched saturated hydrocarbon component of biological origin to be used as a new type of base oil. The process comprising condensation of alcohols, hydrodeoxygenation and isomerization utilizes feedstock, which preferably originates from raw material of biological origin, eventually derived from plant oils, animal fats, natural waxes, and carbohydrates. Also corresponding synthetic materials and combinations thereof may be used as feedstock.

STATE OF THE ART

Base oils are commonly used for the production of lubricants, such as lubricating oils for automotives, industrial lubricants and lubricating greases. They are also used as process oils, white oils and metal working oils. Finished lubricants consist of two components, lubricating base oil and additives. Lubricating base oil is the major constituent in these finished lubricants and contributes significantly to the properties of the finished lubricant. In general, a few lubricating base oils are used to manufacture a wide variety of finished lubricants by varying the mixtures of individual lubricating base oils and individual additives.

Base oils according to the classification of the American Petroleum Institute (API) Group III or IV are used in high-quality lubricants. API base oil classification is shown in following Table 1.

TABLE 1

API base oil classification

| Group | Saturated hydrocarbons, wt-% (ASTM D 2007) | Sulfur, wt-% (ASTM D 1552/ D 2622/D 3120/ D 4294/D 4927) | Viscosity index (VI) (ASTM D 2270) |
|---|---|---|---|
| I | <90 and/or | >0.03 | 80 ≦ VI < 120 |
| II | ≧90 | ≦0.03 | 80 ≦ VI < 120 |
| III | ≧90 | ≦0.03 | ≧120 |
| IV | All polyalphaolefins (PAO) | | |
| V | All other base oils not belonging to Groups I-IV | | |

Oils of Group III are base oils with very high viscosity indices (VHVI), produced by modem methods from crude oil by hydrocracking, followed by isomerization of the waxy linear paraffins to give branched paraffins. Oils of Group III also include base oils produced from Slack Wax paraffins from mineral oils, and from waxes obtained by Fischer-Tropsch synthesis (GTL waxes), for instance from coal or natural gas using corresponding isomerization techniques. Oils of Group IV are synthetic polyalphaolefins (PAO).

A similar classification is also used by ATIEL (Association Technique de l'Industrie Européenne des Lubrifiants, or Technical Association of the European Lubricants Industry), said classification also comprising Group VI: Polyinternalolefins (PIO). In addition to the official classification, also Group II+ is commonly used in the field, this group comprising saturated and non-sulfurous base oils having viscosity indices of more than 110, but below 120. In these classifications saturated hydrocarbons include paraffinic and naphthenic compounds, but not aromatics.

There is also available a definition for base stocks according to API 1509 as: "A base stock is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes." Base oil is the base stock or blend of base stocks used in API-licensed oils. Typical base stock types are 1) Mineral oil (paraffinic, naphthenic, aromatic), 2) Synthetic (polyalphaolefins, alkylated aromatics, diesters, polyol esters, polyalkylene glycols, phosphate esters and silicones) and 3) Plant oil.

Already for a long time, especially the automotive industry has required lubricants and thus base oils with improved technical properties. Increasingly, the specifications for finished lubricants require products with excellent low temperature properties, high oxidation stability and low volatility. Lubricating base oils are base oils having kinematic viscosity of about 3 cSt or greater at 100° C. (KV100); pour point (PP) of about −15° C. or less; and viscosity index (VI) of about 100 or greater. In general, lubricating base oils shall have Noack volatility no greater than current conventional Group I or Group II light neutral oils. Currently, only a small fraction of the base oils manufactured today are able to meet these demanding specifications.

It is no longer possible to produce lubricants complying with the specifications of the most demanding car manufacturers from conventional mineral oils. Typically, mineral oils contain too high concentrations of aromatic, sulfur, and nitrogen compounds, and further, they also have a high volatility and a modest viscosity index, that is, viscosity-temperature dependence. Moreover, response of mineral oils to antioxidant additives is often low. Synthetic and so-called semi-synthetic base oils play an increasingly important role especially in automotive lubricants, such as in engine and gear oils. A similar development can be seen for industrial lubricants. Service life of lubricants is desirably as long as possible, thus avoiding frequent oil changes by the users and further allowing extended maintenance intervals of vehicles for instance in commercial transportation. In the past decade, engine oil change intervals for passenger cars have increased five fold, being at best 50,000 km. For heavy-duty vehicles, engine oil change intervals are at present already on the level of 100,000 km.

Production of lubricants is influenced by increasingly common "Life Cycle Approach" (LCA) relating to environment, health and safety factors of the product. What is aimed with LCA are an extended service life of the product, and minimal drawbacks to the environments, associated with the production, use, handling and disposal of the product. Longer oil change intervals of high-quality base oils result in decreased consumption of non-renewable mineral crude oil based raw materials, and lower amounts of hazardous waste oil products.

In addition to the demands for engine technology and base oil production, also strict environmental requirements direct the industry to develop more sophisticated base oils. Sulfur free fuels and base oils are required in order to gain full effect of new and efficient anti-pollution technologies in modern vehicles and to cut emissions of nitrogen oxides, volatile hydrocarbons and particles, as well as to achieve direct reduction of sulfur dioxide in exhaust gases. The European Union has decided that these fuels shall be available to the market from 2005 and they should be the only form on sale from 2009. Conventional mineral oil base oils contain sulfur, nitrogen, aromatic compounds, and typically also volatile compounds. They are less suitable for new engines and thus also environmentally more detrimental than newer sulfur and aromatic free base oils.

Nowadays, the use of recycled oils and renewable raw materials in the production of lubricants is frequently an object of interest. The use of renewable raw materials of biological origin instead of non-renewable fossil raw materials for producing hydrocarbon components is desirable, because the fossil raw materials are exhaustible and their effect on environment is detrimental. Problems associated with recycled oils include complicated purification and reprocessing steps to obtain base oils with high quality. Further, the development of a functioning and extensive recycling logistic system is expensive.

For the time being, only esters are used in lubricants of renewable and biological origin. The use of esters is limited to a few special applications, such as oils for refrigeration compressor lubricants, bio-hydraulic oils and metal working oils. In normal automotive and industrial lubricants, they are used mainly in additive scale. High price also limits the use of esters. In addition, the esters used in engine oil formulations are not interchangeable with other esters without performing new engine tests, even in cases where the chemical composition of the substituting ester is in principle similar. Instead, base oils consisting of hydrocarbons are partly interchangeable with each other. There are also some technical problems associated with esters. As polar compounds, esters suffer greater seal-swelling tendency than pure hydrocarbons. This has created lot of problems relating to elastomers in hydraulic applications. In addition, ester base oils are hydrolyzed more easily producing acids, which in turn causes corrosion on lubricating systems. Further, even greater disadvantage of esters is that additives developed for non-polar hydrocarbon base oils are not effective for ester base oils.

Condensation of alcohols under basic conditions to give branched isoalcohols with higher molecular weights was described by Guerbet in 1899. The reaction proceeds through dehydrogenation of alcohols to yield aldehydes, which after aldol condensation are rehydrogenated to obtain alpha-branched alcohols. Saturated alcohols are thus condensed to give monofunctional branched 2-alkyl-1-alkanoles, or Guerbet alcohols.

A process for condensing alcohols using alkali metal or alkaline earth metal hydroxides with metal oxide cocatalyst at 200 to 300° C. to give Guerbet alcohols is disclosed in U.S. Pat. No. 5,777,183. In addition to sodium and potassium hydroxides, also sodium and potassium alkoxides, nickel and lead salts, and metal oxides such as oxides of copper, lead, zinc, chromium, molybdenum, tungsten, and manganese may be used as reaction catalysts.

Fatty alcohols may be produced by hydrogenation of either fatty acids or fatty acid alkyl esters. A process for producing fatty alcohols from natural fats and oils and derivatives thereof is disclosed in U.S. Pat. No. 6,683,224. Three types of hydrogenation units for producing alcohols from alkyl esters are in commercial use: Gas phase hydrogenation, trickle-bed hydrogenation and suspension hydrogenation. Of these, the first two comprise a fixed bed catalyst In all processes, a catalyst containing copper chromite is used at 200 to 250° C. under a pressure of 20 to 30 MPa. Unsaturated fatty alcohols are produced using copper-zinc catalysts containing no chromium. Moreover, saturated fatty alcohols may also be produced at 200 to 230° C., under a pressure of about 20 MPa using a nickel catalyst activated with chromium, iron, or rhodium.

FI 100248 presents a process with two steps wherein middle distillate is produced from plant oil by hydrogenation of carboxylic acids or triglycerides of said plant oil to yield linear normal paraffins, followed by isomerization of said n-paraffins to give branched paraffins. The hydrogenation was performed at a temperature ranging from 330 to 450° C., under a pressure of higher than 3 MPa and liquid hourly space velocity (LHSV) being from 0.5 to 5 l/h. The isomerization step was carried out at 200 to 500° C., under elevated pressure and LHSV being from 0.1 to 10 l/h.

EP 209997 discloses a process for producing base oils by isomerization of waxy hydrocarbons derived from crude oil, forming low amounts of lighter fractions. This method is used for instance for producing base oils of Group III from the waxy hydrocracker bottom oils.

Starting materials originating from biological sources contain high amounts of oxygen. In processing, oxygen is converted to water, carbon monoxide, and carbon dioxide. In addition, starting materials of biological origin often contain nitrogen, sulfur and phosphorus known as catalyst poisons and inhibitors of noble metal catalysts. They cause decreased service life of the catalyst and make frequent regeneration of the catalysts necessary. Noble metal catalysts are used in isomerization processes. They are very expensive and highly sensitive to catalyst poisons.

No process utilizing starting materials or intermediates of biological origin, containing heteroatoms, said starting materials being optionally subjected to thermal and/or chemical and/or physical and/or mechanical pre-treatment steps, for producing high-quality base oil is so far disclosed.

On the basis of the above teachings it may be seen that there is an obvious need for an alternative process for producing branched saturated hydrocarbon components preferably from starting materials of biological origin, said process resulting in avoiding, or at least substantially reducing problems associated with the solutions of the prior art.

There is also an obvious need for branched, non-polar paraffinic base oils complying with the requirements for high-quality base oils, said base oil being preferably of biological origin and having more favourable impacts on the environment and for end users than traditional mineral base oils. In addition, there is a need for a process based on the use of renewable feedstock, thus saving non-renewable raw materials.

OBJECTS OF THE INVENTION

An object of the invention is a process for producing a hydrocarbon component.

A further object of the invention is a process for producing a hydrocarbon component utilizing starting materials of biological origin.

Another object of the invention is a process for producing base oils.

Still another object of the invention is a process for producing new type of branched paraffinic base oils not containing heteroatoms, from starting materials of biological origin.

An object of the invention is moreover a base oil complying with the requirements of the API Group III.

Characteristic features of the process and base oils of the invention are presented in the appended claims.

GENERAL DESCRIPTION OF THE INVENTION

The process of the invention comprises a condensation step of alcohols. The alcohols are preferably derived from fatty acids. In the condensation reaction the alcohol molecules of the feedstock react with each other, thus increasing the carbon chain length of the branched component thus obtained. Further, the process of the invention comprises a subsequent hydrodeoxygenation step for removing heteroatoms from the condensation product, and finally, an isomerization step for making branches to the molecular structure and thus improving low temperature properties of the paraffinic product. Preferably starting materials of biological origin are primarily used as feedstock.

Guerbet reaction is preferably used for increasing the carbon number of the hydrocarbon product, said reaction comprising condensation of alcohols to give branched alcohols according to the following equation I:

Here, fatty acids refer to carboxylic acids of biological origin having carbon numbers higher than C1.

Here, alcohols derived from fatty acids, (fatty alcohols), refer to alcohols obtained from fatty acids or triglycerides of biological origin.

Here, hydrodeoxygenation (HDO) refers to oxygen removal from a compound by means of hydrogen. Water is liberated in the reaction, and simultaneously olefinic double bonds are hydrogenated and any sulfur and nitrogen compounds are removed. Reactions of the HDO step are exothermal. After the HDO step, the structure of the starting material has become paraffinic.

Here, saturated base oil comprises saturated hydrocarbons. The term "saturated hydrocarbons" refers to paraffinic and naphthenic compounds, but not to aromatics. Paraffinic compounds may either be branched or linear. Naphthenic compounds are cyclic saturated hydrocarbons, or cycloparaffins, typically derived from cyclopentane or cyclohexane. A naphthenic compound may comprise a single ring structure (mononaphthene) or two isolated ring structures (isolated dinaphthene), or two fused ring structures (fused dinaphthene) or three or more fused ring structures (polycyclic naphthenes or polynaphthenes).

In this context, width of the carbon number range refers to the difference of the carbon numbers of the largest and the smallest molecules, plus one, in the final product.

In this context, pressures are gauge pressures relative to normal atmospheric pressure.

Classification of the Periodic System of the Elements is the IUPAC classification.

BRIEF DESCRIPTION OF DRAWINGS

The invention is now illustrated with the appended figure without wishing to limit the scope of the invention to the embodiments of said figure.

Figure 1:
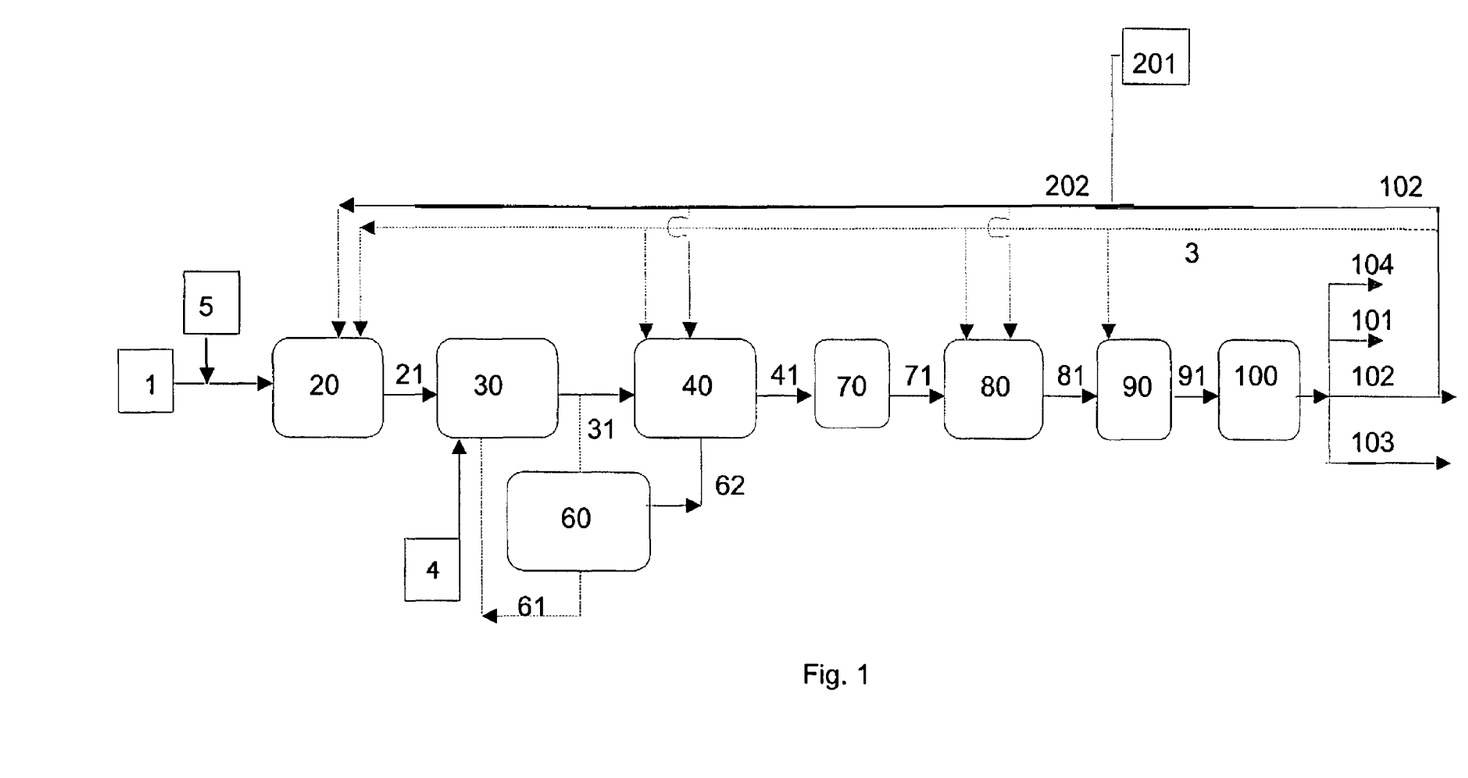
FIG. 1 schematically shows a preferable embodiment of a process according to the invention.

In FIG. 1, fatty alcohol feedstock stream 1 and hydrogen stream 3 are introduced into the optional prehydrogenation reactor 20, optionally receiving part of lighter product fraction (102) to be recirculated or another hydrocarbon stream 201, as diluent. Diluent stream 202 comprises recirculated stream 102, or hydrocarbon stream 201, or a mixture thereof. From the prehydrogenation reactor 20, the product, (saturated alcohol), is passed as stream 21 to the alcohol condensation reactor 30. Alternatively, other alcohols 5, such as alcohols produced synthetically, and diols or polyols 4 comprising two or several alcohol groups are introduced into the process either alone or in combination with the above alcohols derived by reduction from fatty acids. The product reacted at alcohol groups and obtained from the alcohol condensation reactor 30 is passed as stream 31, and hydrogen is passed as stream 3 to the HDO reactor 40. Uncondensed components from the alcohol condensation reactor 30, present in stream 31, may optionally be separated for instance by distillation in the distillation unit 60, followed by recirculation as stream 61 to the alcohol condensation reactor 30. The condensed components are passed as stream 62 to the HDO reactor 40. Paraffinic product with methyl branches obtained from the HDO step is passed as stream 41 to stripping 70 for removing unwanted impurities. Thereafter, the paraffinic product stream 71 and hydrogen stream 3 are introduced to the hydroisomerization reactor 80 of paraffins, said reactor also optionally receiving diluent 202. Following hydroisomerization 80, the obtained branched paraffins 81 may be optionally subjected to finishing 90 using hydrogen stream 3, followed by passing the product as stream 91 to the distillation and/or separation unit 100. In the distillation and/or separation unit 100 product components boiling at different temperature ranges and/or designed for special applications, gases 104, gasoline 101, diesel 102, and base oil 103 are separated.

DETAILED DESCRIPTION OF THE INVENTION

It has now been surprisingly found that branched high-quality base oils are obtained by the process according to the invention comprising condensation of alcohols containing heteroatoms, which condensation is preferably Guerbet reaction, subsequent hydrodeoxygenation reaction, and isomerization reaction. According to the process of the invention, the condensation reaction of alcohols, particularly of biological origin, may be utilized in combination with hydrodeoxygenation and isomerization reactions in a new way for the production of saturated base oils.

In the process of the invention, the length of hydrocarbon chains of the alcohols in the feedstock of biological or synthetic origin is increased in the condensation step, followed by hydrodeoxygenation and the isomerization of the product. Moreover, the process may optionally comprise a prehydrogenation step, recirculation and finishing steps.

It is necessary to increase the length of hydrocarbon chains of alcohols to obtain molecules having only carbon-carbon bonds in the basic structure. According to the invention, this is achieved by allowing primary and/or secondary saturated or unsaturated alcohols, preferably saturated alcohols react with each other, thus producing carbon-carbon bonds in the molecule. In the structure of the obtained intermediates with increased hydrocarbon chain length, an alcohol group is attached to a —$CH_2$— group in the middle of the long main hydrocarbon chain. Alcohols of the feedstock may also comprise two or several hydroxyl groups, thus obtaining several branching sites in the structure of the product. The alcohols may also contain other functional groups.

In the process of the invention, primary and/or secondary saturated or unsaturated alcohols with carbon numbers from C1 to C40, preferably saturated alcohols with carbon numbers from C4 to C24, are reacted with each other in the alcohol condensation step. By this means the hydrocarbon chain length of the feedstock may be increased to achieve the carbon numbers in the range from C18 to C48 as required for base oil applications. For chain lengthening, also alcohols with shorter chains may be used, thus enabling the increase of the molecular weight of the product by lower carbon numbers than by typical carbon numbers of fatty acids ranging from C12 to C24, which yield fatty alcohols with carbon numbers from C12 to C24. In a similar manner, alcohols with two or more functional OH groups may be used for chain lengthening. Alcohols with short chains and/or alcohols with two or more functional groups may be synthetic and/or derived from natural materials such as from fatty acids via metathesis.

In the process of the invention, heteroatoms are removed from the condensation reaction product in the hydrodeoxygenation step, thus liberating oxygen in form of water. In addition, any other oxygen, nitrogen and sulfur compounds are simultaneously removed. Saturated hydrocarbons having branches in the middle of the chain are obtained as the product.

The saturated hydrocarbons obtained in the hydrodeoxygenation step are subjected to hydroisomerization. In the hydroisomerization step the non-branched hydrocarbon chains of the molecules are isomerized so that the molecules contain more short branches, thus improving low temperature properties. Following the hydroisomerization step, oxidation stability of the product may be improved by an optional finishing treatment. In addition, an optional dewaxing may be performed prior to or after the finishing.

Also branched paraffins with shorter chains of the diesel and gasoline class are produced in the process as by-products.

Feedstock

The feedstock of the process comprises at least one alcohol selected from the group consisting of primary and secondary, saturated and unsaturated C1-C40 monohydroxy alcohols, diols and polyols, and mixtures thereof. Alcohols include both synthetic alcohols and alcohols of biological origin, preferably saturated alcohols, and C4-C24 alcohols being preferably used. Alcohols with short chains, as well as alcohols with two or more functional OH groups may be synthetic and/or produced from natural materials. Fatty alcohols derived from biological raw materials, optionally subjected to one or several purification and/or conditioning steps of the prior art are preferably used as the feedstock. Conditioning steps include e.g. hydrolysis to produce fatty acids, transesterification with an alcohol or acid, esterification for producing fatty acid alkyl esters, reduction of fatty acids or fatty acid alkyl esters to give alcohols, as well as the metathesis of fatty acids.

Alcohols contained in the feedstock may be produced using any known methods, preferably from starting materials of biological origin, such as plants, animals and/or fishes. Corresponding starting materials derived from algae and insects are also contemplated as well as starting materials derived from aldehydes and ketones prepared from carbohydrates.

The starting material of biological origin is suitably selected from the group consisting of:

a) plant fats, plant oils, plant waxes, animal fats, animal oils, animal waxes, fish fats, fish oils, fish waxes, and b) free fatty acids or fatty acids obtained by hydrolysis, acid transesterification or pyrolysis reactions from plant fats, plant oils, plant waxes, animal fats, animal oils, animal waxes, fish fats, fish oils, fish waxes, and c) esters obtained by transesterification from plant fats, plant oils, plant waxes, animal fats, animal oils, animal waxes, fish fats, fish oils, fish waxes, and d) fatty acid alkyl esters obtained by esterification of alcohols with fatty acids of plant, animal and fish origin, and e) alcohols obtained as reduction products of free fatty acids, or fatty acids from plant fats, plant oils, plant waxes, animal fats, animal oils, animal waxes, fish fats, fish oils, fish waxes, and f) fatty alcohols obtained by hydrolysis, transesterification and pyrolysis from waxes of biological origin, and g) waste and recycled food grade fats and oils, and fats, oils and waxes obtained by genetic engineering, and h) mixtures of said starting materials.

Plant and fish oils, and animal fats typically comprise triesters of glycerol with fatty acids, having the following structure:

wherein $R_1$, $R_2$ and $R_3$ represent C4-C30 hydrocarbon chains. With respect to the hydrocarbon chain, said fatty acids are unbranched carboxylic acids with long chains. Main hydrocarbon chain lengths are 18 carbons (C18). C18 fatty acids are typically bonded to the middle hydroxyl group of glycerol. Fatty acids linked to the two other hydroxyl groups typically have even carbon numbers, generally between carbon numbers C14 and C22.

Fatty acid composition of the starting material of biological origin may considerably vary among feedstocks from different sources. While several double bonds may be present in fatty acids, they are non-conjugated, but at least one intermediate —$CH_2$— unit is between them. With respect to configuration, the double bonds of natural fatty acids are of cis form, hydrogen atoms being thus located on the same side of the rather rigid double bond. As the number of the double bonds increase, they are generally located at the free end of the chain. Lengths of hydrocarbon chains and numbers of double bonds depend on the various plant or animal fats, oils or waxes serving as the source of the fatty acid. Animal fats typically contain more saturated fatty acids than unsaturated fatty acids. Fatty acids of fish oil contain high amounts of double bonds, and the average length of the hydrocarbon chains is higher compared to fatty acids of plant oils and animal fats.

Fatty acid composition of the starting material of biological origin plays an important role in estimating oxidation resistance, thermal stability, and low temperature properties of the feedstock, and also in governing the types of products obtained by the condensation reaction. Unsaturated components, which may be present in the feedstock, readily undergo oligomerization forming compounds with ring structures, and following hydrogenation, result in oligomeric hydrocarbons and hydrocarbons with ring structures in the final product.

Waxes are mainly fatty acids esterified with alcohols having long chains. Moreover, waxes contain various amounts of paraffins (n-alkanes), ketones, and diketones, primary and secondary alcohols, aldehydes, alkane acids (fatty acids) and terpenes. Carbon numbers of such fatty acid and alcohol chains are typically from C12 to C38.

Examples of suitable biological starting materials include fish oils such as baltic herring oil, salmon oil, herring oil, tuna oil, anchovy oil, sardine oil, and mackerel oil; plant oils such as rapeseed oil, colza oil, canola oil, tall oil, sunflower seed oil, soybean oil, corn oil, hemp oil, olive oil, cottonseed oil, mustard oil, palm oil, peanut oil, castor oil, jatropha seed oil, palm kernel oil and coconut oil; and moreover, suitable are also animal fats such as lard, tallow, and also waste and recycled food grade fats and oils, as well as fats, waxes and oils produced by genetic engineering. In addition to fats and oils, suitable starting materials of biological origin include animal waxes such as bee wax, Chinese wax (insect wax), shellac wax, and lanoline (wool wax), as well as plant waxes such as carnauba palm wax, ouricouri palm wax, candelilla wax, jojoba seed oil, rice bran oil, esparto wax and Japan wax.

The process may also be used for processing mixtures feed originating from biological and synthetic feedstocks, and if necessary, feedstocks produced by other processes. Synthetically produced feedstocks suitable for the process step in question may also be used as additional feedstocks. Also pure synthetic feedstocks are contemplated, but in this case, the products are not based on renewable natural resources.

In addition to monoalcohols, also diols and/or polyols may be used as feedstocks in the process of the invention. Suitable diols include e.g. diols derived from dicarboxylic acids, dimers of fatty alcohols, and 2,2-dimethyl-1,3-propane diol (NPG). Suitable polyol alcohols include for instance glycerol, 2-ethyl-2-hydroxymethyl propane-1,3-diol (TMP), 2-methyl-2-hydroxymethyl propane-1,3-diol (TME), 2-butyl-2-ethyl-propane-diol (BEPD), and 2,2-bis(hydroxymethyl)-1,3-propane-diol (PET). For the thermal stability of the base oils being produced, alcohols not containing tertiary carbon are preferably used.

Particularly for improving low temperature properties and for producing heavier base oils, branched additional components to obtain branching sites in the molecular structure of the base oils may be used.

Hydrocarbons serving as diluents, for instance hydrocarbons of the diesel class, preferably of biological origin may be optionally added to the feedstock in different process steps. Boiling range of hydrocarbons of the diesel class is from 150 to 400° C., typically from 180 to 360° C.

Process

Alcohol Condensation Step

Feedstock comprising primary and/or secondary, saturated and/or unsaturated C1-C40 alcohols is subjected to condensation to substantially increase the carbon number of the hydrocarbon product. Saturated alcohols are preferably used as the feedstock. In the process the Guerbet reaction is preferably used for obtaining branched monofunctional and branched polyfunctional alcohols respectively from monohydroxy and polyhydroxy alcohols in the condensation reaction. Known basic catalysts of the Guerbet reaction, selected from hydroxides and alkoxides of alkali and alkaline earth metals, and metal oxides, in combination with a co-catalyst comprising a metal salt are used as reaction catalysts. The amount of the basic catalyst varies from 1 to 20%, preferably from 1.5 to 10% by weight. Suitable co-catalysts include salts of chromium(III), manganese(II), iron(II), cobalt(II), lead(II) and palladium, stannic oxide and zinc oxide, the salts being salts soluble in water or alcohols, preferably sulphates and chlorides. The co-catalyst is used in amounts varying between 0.05 and 1%, particularly preferably between 0.1 and 0.5%, by weight. Hydroxides or alkoxides (alcoholates) of alkali metals together with zinc oxide or palladium chloride serving as the co-catalyst are preferably used in the reaction Chain lengthening by means of the condensation reaction of alcohols is performed at 200 to 300° C., preferably at 240 to 260° C., the reaction being carried out under vapour pressure provided by the alcohols present in the reaction mixture. Water is liberated in the reaction, said water being continuously separated. Alternatively, the chain lengthening reaction may be run using a short residence time, while separating unreacted lighter components from already reacted heavier ones for instance by distillation, followed by recirculating the lighter components to the chain lengthening step.

Hydrodeoxygenation Step

In the subsequent HDO step, heteroatoms of the products obtained in the condensation reaction of alcohols are removed. In the HDO step the product of the condensation step and hydrogen gas are reacted under a pressure ranging between 0.1 and 20 MPa, preferably between 1 and 15 MPa, the temperature being from 100 to 500° C., preferably from 150 to 350° C. In the HDO step, special catalysts containing a metal of the Group VIII and/or VIA of the periodic system of the elements is used. The HDO catalyst is preferably a supported Pd, Pt, Ru, Rh, Ni, NiMo or CoMo catalyst, the support being activated carbon, alumina and/or silica.

In a preferable embodiment, the reaction product obtained after the HDO step is purified for instance by stripping with steam or a suitable gas such as a light hydrocarbons, nitrogen or hydrogen. It is favourable to remove impurities and water as efficiently as possible prior to the hydroisomerization step and optional finishing step.

Hydroisomerization Step

After the HDO and the optional purification steps, hydroisomerization is carried out by reacting hydrogen gas, the previously obtained hydrogenated component, and optional paraffinic additional feed, in the presence of an isomerization catalyst. In the hydroisomerization step, the pressure ranges from 0.1 to 20 MPa, preferably from 1 to 15 MPa. The temperature ranges between 100 and 500° C., preferably between 200 and 400° C. In the hydroisomerization step, special catalysts containing molecular sieves and metals of the Group VIII of the periodic system of the elements, for instance Ni, Pt. and Pd, may be used. Alumina and/or silica may be used as supports.

Prehydrogenation Step

Optionally the feedstock comprising alcohols may be subjected to a prehydrogenation step before the condensation step, under mild conditions to hydrogenate possible double bonds in components in the feed, such as unsaturated alcohols, and to reduce coke formation in the next process step since catalytic activity is mainly lost due to coal formation on the surface thereof. The prehydrogenation is carried out in the presence of a hydrogenation catalyst at temperatures between 50 and 400° C., under a hydrogen pressure ranging from 0.1 to 20 MPa, preferably at temperatures between 150 and 300° C., under a hydrogen pressure ranging from 1 to 10 MPa. The prehydrogenation catalyst contains metals of the Group VIII and/or VIA of the periodic system of the elements. The prehydrogenation catalyst is preferably a supported Pd, Pt, Rh, Ru, Ni, Cu, CuCr, NiMo or CoMo catalyst, the support being activated carbon, alumina and/or silica.

Dewaxing Step

Following the hydroisomerization step, also an optional dewaxing step may be performed either catalytically or as solvent-based dewaxing. In the catalytic dewaxing, hydrogen gas and the component to be isomerized, as well as optional paraffinic additional feed react in the presence of a dewaxing catalyst. Zeolite catalysts comprising metals of the Group VIII of the periodic system of the elements, such as Ni, Pt or Pd are suitably used. In the dewaxing step, the pressure varies from 0.1 to 20 MPa, the temperature being between 100 and 500° C.

In the solvent-based dewaxing, paraffinic waxes are separated by dissolving the oil (isomerized product) in a mixture of solvents, for instance methylethyl ketone and toluene. In the process, the solvent and the feed are passed in counter current manner and thus mixed. The mixture of oil and solvent is introduced to a cooling unit. Cooling results in crystallization of the paraffinic waxes. The cooling temperature depends on the desired low temperature properties of the product. Wax crystals are filtered from the mixture, collected for further processing, and the solvent is separated by evaporation from the base oil.

Finishing Step

The product obtained above may optionally be subjected to finishing for removing any double bonds and aromatics. In case said finishing is performed using hydrogen in the presence of a catalyst, it is called hydrofinishing, the pressure thus ranging from 1 to 20 MPa, preferably from 2 to 15 MPa, and the temperature ranging between 50 and 500° C., preferably between 200 and 400° C. In the hydrofinishing, special catalysts containing metals of the Group VIII of the periodic system of the elements, and alumina and/or silica may be used. The hydrofinishing catalyst is preferably a supported Pd, Pt, or Ni catalyst, the support being alumina and/or silica. Finishing may also be achieved by removing polar components using adsorption materials, such as clay or molecular sieves.

The obtained product is passed to a distillation and/or separation unit for separating product components boiling over different temperature ranges and/or intended for different applications.

If desired, the hydrocarbon component obtained as the product, or another suitable hydrocarbon may be used as diluent in various stages of the process of the invention, such as in the alcohol condensation, HDO and/or isomerization steps for increasing the conversion and/or selectivity and/or for controlling the exothermal nature of the reactions.

A fixed catalyst bed reactor, for instance the trickle-bed reactor of the prior art is preferably used in prehydrogenation, HDO, hydroisomerization, and hydrofinishing steps.

Product

The process according to the invention yields a new type of high quality branched and paraffinic hydrocarbon component suitable as a base oil. The base oil product has excellent viscosity and low temperature properties. The process according to the invention also yields as by-product branched and paraffinic hydrocarbon product suitable for diesel fuel pool. The diesel component contains typically some short carbon-carbon side branches, resulting in an exceptionally low cloud point and cold filter plugging point but still a good cetane number. In addition, a hydrocarbon component, suitable as solvent, gasoline and/or a component of gasoline, is obtained as by-product. All these products are preferably of biological origin.

Feedstocks, and particularly feedstocks derived from biological starting materials have a substantial effect on the composition and distillation range of the product. For instance feedstocks derived from fatty acids may be fractionated by distillation to give fractions having narrow carbon number ranges to be tailored according to requirements of various applications. For feedstocks having hydrocarbon chains of C16, C18, C20 and C22, typical carbon numbers of the products are respectively C32, C36, C40, and C44. Product fractions having narrow carbon number ranges are obtained since the distillation range of the product mainly depends on the length of the hydrocarbon chain of the feedstock. Base oils obtained according to the invention, having narrow distillation ranges, have extremely low volatilities when compared to corresponding products of the prior art.

Carbon number ranges of the base oils of the invention are extremely narrow, typically no more than 5 carbons for typical C16/C18 feedstocks. Some structures and carbon number ranges of the base oils produced by the process according to the invention (with kinematic viscosity of 4-6 cSt/100° C.) are presented in Table 2. The carbon number is governed by the carbon number of the feedstock. The carbon number of the hydrocarbons the base oil according to the invention is at least C18, preferably between C26 and C40.

Typical structures and carbon number ranges (C25-C35) of synthetic hydroisomerized hydrocarbon base oils VHVI, GTL and Slack Wax (SW) base oils of the prior art, derived from mineral oils, and belonging to the same viscosity class (about 4 to 6 cSt/100° C.), are also presented in Table 2. Structures of naphthenes are typical examples of these compounds.

TABLE 2

Carbon numbers and structures of base oils

| Base oil | Carbon number/ % by FIMS | Structure |
|---|---|---|
| 1. Derived from fatty Alcohol | C32/C34/C36 acyclic component about 90% mononaphthenes about 10% | |

TABLE 2-continued

Carbon numbers and structures of base oils

| Base oil | Carbon number/% by FIMS | Structure |
|---|---|---|
| 2. Derived from fatty alcohol and diol | acyclic component about 90% mononaphthenes about 10% | |
| 3. GTL | C25-C35 acyclic component about 90% mononaphthenes about 10% | |
| 4. Slack Wax (SW) | C25-C35 acyclic component about 70% mononaphthenes about 25% dinaphthenes about 5% | |

TABLE 2-continued

Carbon numbers and structures of base oils

| Base oil | Carbon number/ % by FIMS | Structure |
|---|---|---|
| 5. VHVI | C25-C35 acyclic component about 40% mononaphthenes about 35% dinaphthenes about 15% other naphthenes about 10% |  |

Base oils shown in Table 2 are produced as follows:
 1. Base oil according to the invention is obtained by condensing, hydrogenating and hydroisomerizing feed comprising C16 fatty alcohol.
 2. Base oil according to the invention is obtained by condensing, hydrogenating and hydroisomerizing feed comprising C10 diol and C12 fatty alcohol
 3. GTL is an isomerization product of the Fischer-Tropsch waxy fraction.
 4. SW is an isomerization product of the Slack Wax waxy fraction, derived from mineral oil.
 5. VHVI is hydrocracked and isomerized base oil derived from mineral oil.

Saturated hydrocarbons are classified by field ionization mass spectrometry using the FIMS method, according to the carbon and hydrogen atoms, as follows:

| 1 | $C(n) \cdot H(2n+2)$ | paraffins |
| 2 | $C(n) \cdot H(2n)$ | mononaphthenes |
| 3 | $C(n) \cdot H(2n-2)$ | dinaphthenes |
| 4 | $C(n) \cdot H(2n-4)$ | trinaphthenes |
| 5 | $C(n) \cdot H(2n-6)$ | tetranaphthenes |
| 6 | $C(n) \cdot H(2n-8)$ | pentanaphthenes |

In Table 2, the percentages (% by FILMS) refer to the groups of compounds determined according to said method.

Using feedstocks with different hydrocarbon chains and the alcohol condensation reaction, molecular masses of the products may be increased to reach viscosity ranges required for different applications. It is thus possible to produce lighter hydrocarbon products such as solvents, gasoline, and diesel fuels from feedstocks with shorter chains, and base oils from feedstocks with longer chains.

With respect to molecular structure, base oils or base oil components of the invention differ from products of the prior art as may clearly be seen from Table 2. The product obtained by process according to the (structure 1 in Table 2) has methyl branches at the ends of the hydrocarbon component, and to a lesser extent ethyl branches within the hydrocarbon chain, and in addition methyl branch or branches in the middle of the main hydrocarbon chain. The product differs from the GTL and SW products of the prior art (structures 3 and 4 in Table 2) typically having branches only at the ends of the chains. Branches located in the middle of the hydrocarbon chain lower the pour point considerably more than those at the ends of the chain. In addition to the location of the branches, the number thereof affects the pour point, the pour point being lowered by increasing branching, but at the same time also the viscosity index is reduced. Accordingly, being favourable for the pour point and viscosity index, the number of the branches should be limited.

There exists an optimum correlation between the viscosity index and pour point with the main hydrocarbon chain comprising only a few branches. Accordingly, to improve the pour point, the paraffin with methyl branches requires less isomerization in the process of the invention after the HDO step in comparison to paraffinic waxes completely free of branches of the prior art. Typically the heavier products of the invention comprise relatively high proportions of isomerized molecules containing more than 30 carbon atoms. Such branched high molecular weight compounds typically also exhibit high viscosity indices (VI) even though pour point is below −20° C.

The base oil according to the invention, is comprises branched hydrocarbons having carbon number at least C18, and it comprises at least 90%, preferably at least 95%, and particularly preferably at least 97% by weight of saturated hydrocarbons. Preferably the base is of biological origin and produced from starting materials of biological origin. It comprises not more than 15% by weight, preferably not more than 10% by weight and particularly preferably not more 5% by weight of mononaphthenes. It comprises not more than 1% by weight, preferably not more than 0.5% by weight and particularly preferably 0.1% by weight of fused dinaphthenes and polynaphthenes.

For base oils according to invention the viscosity index is more than 120, preferably at least 130, particularly preferably at least 140 (ASTM D 2270). The pour point is lower than −9° C., preferably lower than −12° C. and particularly preferably lower than −15° C. (ASTM D 5950).

Width of the carbon number range of base oils of the invention is no more than 5 carbons, preferably no more than 3 carbons, and particularly preferably no more than 1 carbon (FIMS). At least 60% by weigh of the product has carbon number within the specified range (no more than 5 carbons, etc.), preferably at least 75% by weight and particularly preferably at least 90% by weight.

Distillation range of base oils of the invention is no more than 150° C., preferably no more than 100° C., particularly preferably no more than 70° C. (determined by the method of ASTM D 2887, distillation points D10 and D90).

Sulfur content of base oils of the invention is less than 300 ppm, preferably less than 50 ppm, and particularly preferably less than 1 ppm (ASTM D 3120).

Nitrogen content of base oil of the invention is less than 100 ppm, preferably less than 10 ppm, and particularly preferably less than 1 ppm (ASTM D 4629).

The volatility of the base oil of the invention, having KV100 from 3 cSt to 8 cSt, is no more than $2271.2*(KV100)^{-3.5373}$% by weight as determined by the method of DIN 51581-2 (Mathematical Noack method based on ASTM D 2887 GC distillation).

The base oil of the invention, based on biological starting materials, contains carbon $^{14}C$ isotope, which may be considered as an evidence of the use of renewable raw materials. Typical $^{14}C$ isotope content (proportion) of the total carbon content in the product, which is completely biological origin, is at least 100%. Carbon $^{14}C$ isotope content is determined on the basis of radioactive carbon (carbon $^{14}C$ isotope) content in the atmosphere in 1950 (ASTM D 6866). The $^{14}C$ isotope content of the base oil according to the invention is lower in cases where other components besides biological components are used in the processing of the product, said proportion being, however, more than 50%, preferably more than 90%, particularly preferably more than 99%. In this way, even low amounts of base oil of biological origin may be detected in other types of hydrocarbon base oils.

Advantages Of The Invention

The process of the invention particularly allows for the use of renewable starting materials of biological origin, containing heteroatoms, for producing base oils, but also diesel and gasoline components as by-products. In addition to traditional crude oil, a completely novel raw material source for high-quality branched paraffinic base oils is provided according to the invention. Also carbon dioxide emissions contributing to the greenhouse effect may be reduced by using renewable raw material sources instead of non-renewable ones.

According to the invention, a base oil only containing carbon and hydrogen is obtained, the stability of said base oil in humid conditions being higher than that of base oils containing esters or other heteroatoms. A paraffinic hydrocarbon component is not decomposed as easily as esters that form corrosive acids. A non-polar and fully saturated hydrocarbon component free of sulfur is obtained using the process of the invention by removing oxygen and the heteroatoms of any impurities of the feedstock in the HDO step.

In the isomerization step, the carbon chain is branched, thus improving low temperature properties, that is, the pour point is lowered and filterability at low temperatures is improved. Wax is converted to an oily hydrocarbon having a viscosity index (viscosity-temperature-dependence) very suitable for base oils without any blending limitations, and further it is fully compatible with lubricant additives.

With the process of the invention, high-quality saturated base oils having a low pour point may be produced, said base oils being thus very useful at low temperature conditions. The product is typically free of sulfur, the viscosity index thereof being preferably at least 120, and thus it may also be suitably used in applications of API Group III base oils.

Fatty alcohols derived from distilled fatty acids and fatty acid alkyl esters to give fractions according to carbon numbers may be used as feedstock. Branched paraffinic base oils having narrow boiling ranges and various physical properties may be processed from these fractions according to the invention. Typical carbon number ranges of the product components are as follows: gas C1-C4, gasoline C5-C10, diesel C11-C26, base oil at least C18. Distillation range of base oils produced from a feedstock having a single carbon number is narrow.

Narrow distillation range indicates that the product does not contain any light fraction (meaning molecules considerably lighter than the average), as can be seen as decreased volatility of the product, resulting in reduced emissions and reduced use of lubricants in practical applications. Neither any heavier components (meaning molecules considerably heavier-than the average), are contained in the product. This results in excellent low temperature properties of the product.

For the base oil of the invention, the carbon number and distillation range are mainly governed by the feedstock composition. For base oils of the prior art, the distillation range is adjusted by distilling the product in order to obtain a fraction having the desired kinematic viscosity. It is preferable for the lubricants to have base oils with narrow carbon number ranges and thus narrow distillation ranges. Therefore, the compositions of base oils according to the invention contain molecules of similar sizes, behaving in a similar way under different conditions.

The base oil according to the invention has high viscosity index, which leads to a significantly decreased need of high price Viscosity Index Improver (VII) or in other terms Viscosity Modifier (VM). It is commonly known, that the VII is an additive, which causes highest amount of deposits in vehicle engines. In addition, reduction of the amounts of VII results in significant savings in costs.

Also, because the base oil is non-toxic, contains no sulfur, nitrogen or aromatic compounds typically present in the conventional mineral oil based products, it may more safely be used in applications where the end user is exposed to oil or oil spray.

Moreover, the response of the base oil according to the invention is extremely high for antioxidants and pour point depressants, and thus the life time of the lubricating oils are longer and they can be used in the colder environment than lubricants based on the conventional base oils.

The base oil of the invention is also chemically more stable than products based on more reactive esters, and the oxidation resistance thereof is better than that of base oils based on fatty acids or fatty alcohol dimers, or base oils based on esters, produced from unsaturated fatty acids of biological origin.

Compared to esters, the base oil of the invention is more compatible with conventional base oils derived from crude oil, base oils obtained from Fischer-Tropsch process, and with hydrocarbon base oils, as well with lubricant additives. Moreover, it is compatible with elastomers, and thus it can be used in modem vehicle engines without modifications.

An additional advantage of the base oil according to this invention is that it fulfils the API group III base oil specifications. Therefore it can be used in engine oil formulations like other group III base oils according the same interchanging rules without need to perform new engine tests.

The base oil of the invention is preferably based on renewable natural resources. Starting materials of the process of the invention are available all over the world, and moreover, the utilization of the process is not limited by significant initial investments in contrast for instance to the GTL technology.

The products of the inventive process are carbon dioxide neutral with respect to the use and disposal thereof, that is, they will not increase the carbon dioxide load of the atmosphere in contrast to products derived from fossil starting materials.

At least one methyl branch is found in the middle of the main hydrocarbon chain in the hydrocarbon component produced by the process of the invention. Such C11-C26 hydrocarbons with at least one methyl branch of the diesel class, produced from C5-C13 feedstocks, have superior low temperature properties, that is, they are liquid even at low temperatures, the cloud point being low. In contrast, for heavier C26-C40 hydrocarbon components and for base oil applications, more than one branch is necessary, said branches being obtained mainly by hydroisomerization.

By means of the optional prehydrogenation step, coal formation on the catalyst may be reduced, and moreover, prehydrogenation results in improved yield of the base oil component product.

EXAMPLES

Example 1

Condensation of C16 alcohol derived from palm oil, followed by hydrodeoxygenation 200 g of primary saturated C16 fatty alcohol (hexadecanol), palladium chloride (5 ppm palladium) and 12 g of sodium methoxylate were put in a Parr reactor. Mixing was adjusted to 250 rpm, temperature to 250° C. and pressure to 0.5 MPa. Slight nitrogen purge was maintained to sweep out water liberated in reaction. The condensation reaction was carried out until the amount of condensed alcohol was stabilised in GC analysis. After reaction the product was neutralized with hydrochloric acid, washed with water and dried with calcium chloride.

In the next HDO step, the condensed alcohol obtained above was hydrodeoxygenated in a high pressure Parr reactor using a dried and activated $NiMo/Al_2O_3$ catalyst, to give a methyl branched paraffin. The alcohol was hydrogenated at 340° C., under a pressure of 5 MPa, mixing at 300 rpm until no alcohol peak was detected in the FTIR (infrared) spectrum. The pour point of the obtained methyl branched C32 paraffin wax was 69° C. The other properties are given in table 3.

Example 2

Condensation of fatty alcohol derived from palm kernel oil and diol

C10 diol (1,10-decandiol, 60 g) and C12 primary alcohol (140 g), in molar ratio 1:3 were weighed in a Parr reactor. After that palladium chloride (5 ppm palladium) and 12 g of sodium methoxylate were put in the reactor. Mixing was adjusted to 250 rpm, temperature to 250° C. and pressure to 0.5 MPa. Slight nitrogen purge was maintained to sweep out water liberated in reaction. Condensation reaction was carried out until the amount of condensed alcohol was stabilised in GC analysis. After reaction the product was neutralized with hydrochloric acid, washed with water and dried with calcium chloride.

In the next HDO step, the condensed alcohol mixture obtained above was hydrogenated in a high pressure Parr reactor using a dried and activated $NiMo/Al_2O_3$ catalyst, to give a methyl branched paraffin. The alcohol was hydrogenated at 340° C., under a pressure of 5 MPa, mixing at 300 rpm until no alcohol peak was detected in the FTIR spectrum. The carbon numbers of the components in the product mixture were C12+C10+C12=C34 with two methyl branches, C12+C12=C24 and C10+C10=C20 with one methyl branch and C12+C10+C10+C12=C44 with three methyl branches. The pour point of soft methyl branched paraffin wax was 18° C. Other properties are given in table 3.

Example 3

Hydroisomerization

The C32 paraffin wax obtained in Example 1 was isomerized in a Parr reactor to give a branched paraffin of the base oil class using a reduced Pt molecular sieve/$Al_2O_3$ catalyst. Preheated paraffin was isomerized under a hydrogen pressure of 3 MPa and at 340° C. until a pour point under −15° C. was obtained. Finally, light fractions were distilled from the product at reduced pressure. The properties of the condensed, hydrodeoxygenated and hydroisomerized baseoil are given in table 3.

It is essential to isomerize the hydrocarbon compounds produced by alcohol condensation reaction followed by hydrodeoxygenation to improve their cold properties. Due to high proportion of higher boiling compounds, the VI of the product of invention is high even though pour point is under −20° C.

TABLE 3

Carbon numbers and properties of compounds in examples

|  |  | Ex 1 | Ex 2 | Ex 3 |
|---|---|---|---|---|
| FIMS | Average MW | 451 | 478 | 451 |
|  | PARAFFINS | 100 | 100 | 90.4 |
|  | MONONAPHTHENES | 0 |  | 9.2 |
|  | DINAPHTHENES | 0 |  | 0.4 |
|  | TRINAPHTHENES | 0 |  | 0 |
|  | TETRANAPHTHENES | 0 |  | 0 |
|  | PENTANAPHTHENES | 0 |  | 0 |
|  | Aver. C/molecule | 32 |  | 32 |
| Baseoil properties | PP ° C. (ASTM D5950) | 69 | 18 | −26 |
|  | VI (ASTM D2270) | 203 |  | 145 |
|  | KV100 cSt (ASTM D445) | 4.9 |  | 4.3 |
|  | Noack volatility, wt-% (DIN 51581-2) |  |  | 11.1 |
| GC distillation ASTM D2887 | D10, ° C. |  |  | 390 |
|  | D50, ° C. |  |  | 444 |
|  | D90, ° C. |  |  | 455 |

It is essential that high quality base oil has high viscosity index and low pour point. Pour point is lowered by increasing branching, but at the same time also the viscosity index is reduced. As shown in examples 1 and 2 in table 3, one or two branches in baseoil are not enough to lower the pour point (PP) to favourable region below −12° C. The properties of the hydrocarbon components produced with the process according to the invention are excellent as shown in table 3. The products are well suited as base oils without blending limitations, and further, the products are also compatible with lubricant additives. It is however clear that the invention is not limited to embodiments described in the examples, or to combinations thereof. The invention may also be carried out in other ways without departing from the invention.

In following Table 4 properties of the base oils of the prior art are shown for comparison.

TABLE 4

Properties of base oils

| Analysis | API GpIII, HC-CDW | API GpIII, HC-CDW | API GpIII, SW | API GpIV, PAO | Method |
|---|---|---|---|---|---|
| KV100 (cSt) | 4.3 | 6.0 | 4.0 | 5.7 | ASTM D445 |
| KV40 (cSt) | 20.0 | 33.1 | 16.8 | 30 | ASTM D445 |
| VI | 122 | 128 | 140 | 135 | ASTM D2270 |
| Pour point (° C.) | −18 | −12 | −21 | <−63 | ASTM D5950 |
| GC distillation (° C.) | | | | | ASTM D2887 |
| 10% | 395 | 412 | 394 | | |
| 50% | 421 | 459 | 421 | | |
| 90% | 456 | 513 | 459 | | |
| GC-Noack, w-% | 13.3 | 5.8 | 12.5 | | DIN 51581-2 |
| Molecular distribution, w-% | | | | | |
| Aromatics | 0.0 | 0.0 | 0.0 | 0.0 | ASTM D2549 |
| Paraffins | 37.0 | 26.8 | 72.4 | 100 | FIMS |
| Mononaphthenes | 37.3 | 39.3 | 23.9 | 0 | FIMS |
| Dinaphthenes | 16.1 | 20.3 | 3.5 | 0 | FIMS |
| Other naphthenes | 9.8 | 13.6 | 0.2 | 0 | FIMS |
| Sulfur, ppm | <0.2 | <0.2 | | <1 | ASTM D3120/ D 4294 |
| Nitrogen, ppm | <1 | <1 | | <1 | ASTM D4629 |

HC-CDW = hydrocracked, catalytically dewaxed base oil

Example 4

Carbon Number Distribution

Figure 2:
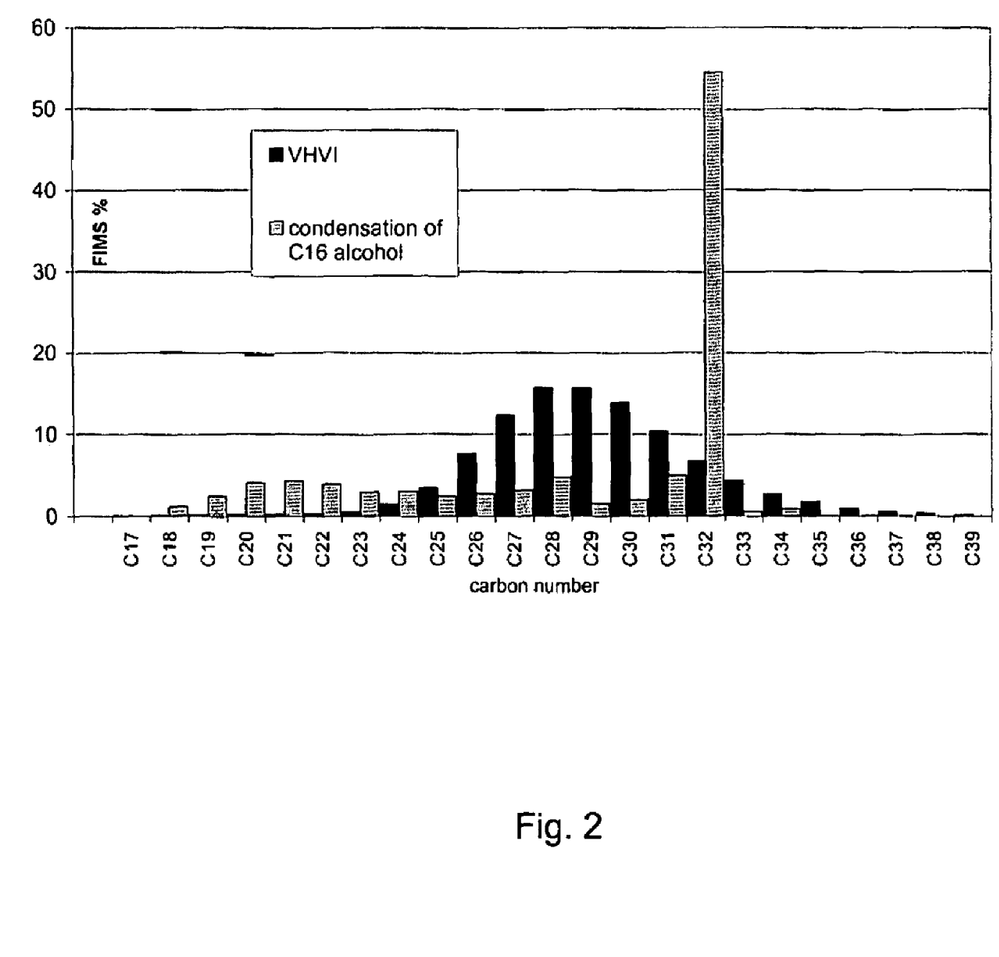
FIG. 2 compares the baseoils of the invention with the conventional product of the same viscosity range.

The proportion of the narrow carbon number distribution of the base oil product is dependent on distillation. In FIG. 2 the carbon number distributions by FIMS of VHVI (413-520° C. cut) and the baseoil of invention (360° C. cut) are shown. In addition to the narrow carbon number distribution, the carbon number distribution of the base oils according to invention is narrower than that of conventional base oils when distillation is cut in similar manner at >413° C. corresponding to C26 paraffin. The baseoils of the invention contain higher amount of higher boiling fractions compared to the conventional product of same viscosity range (KV100 about 4 cSt), as shown in FIG. 2. The lower boiling components with carbon number <C31 in FIG. 2 are due to cracking in isomerization. The relatively high proportion of the higher boiling compounds enhances VI of the final base oil product.

The invention claimed is:

1. Process for producing base oil, characterized in that
   a) feedstock comprising at least one alcohol selected from the group consisting of primary and secondary saturated and unsaturated C1-C40 monohydroxy alcohols, diols, and polyols, is condensed in the presence of a basic catalyst at a temperature ranging from 200 to 300° C. to obtain a condensation product comprising branched monofunctional and branched poly-functional alcohols, respectively,
   b) the condensation product is hydrodeoxygenated in the presence of a hydrodeoxygenation catalyst under a hydrogen pressure ranging from 0.1 to 20 MPa at a temperature ranging from 100 to 500° C. to obtain a saturated hydrocarbon, and then
   c) the non-branched carbon chains of the hydrodeoxygenated product are hydroisomerized in the presesence of an isomerization catalyst under a hydrogen pressure ranging from 0.1 to 20 MPa at a temperature ranging from 100 to 500° C.

to obtain a base oil, wherein said base oil comprises:
   i) branched hydrocarbons having carbon numbers of at least C18,
   ii) at least 90% by weight of saturated hydrocarbons,
   iii) mononaphthenes not more than 15% by weight
   iv) fused dinaphthenes and polynaphthenes not more than 1% by weight, and
   v) at least 60% by weight of the saturated hydrocarbons are within the carbon number range of no more than 5.

2. The process according to claim 1, characterized in that the feedstock comprises at least one alcohol selected from the group consisting of saturated C4-C24 fatty alcohols, and mixtures thereof.

3. The process according to claim 2, characterized in that the alcohol is derived from a starting material of biological origin selected from the group consisting of plant oils, plant waxes and plant fats; animal oils, animal fats and animal waxes; fish oils, fish fats and fish waxes; recycled food grade fats and oils; fats, oils and waxes obtained by genetic engineering; oils and fats derived from algae and insects; and mixtures of said starting materials.

4. The process according to claim 2, characterized in that the alcohol is derived from a starting material of biological origin of aldehydes and ketones prepared from carbohydrates by acid hydrolysis process.

5. The process according to claim 1, characterized in that the condensation step is carried out at a temperature ranging from 240 to 260° C.

6. The process according to claim 1, characterized in that the basic catalyst is selected from hydroxides and alkoxides of alkali and alkaline earth metals, and metal oxides, in combination with a co-catalyst comprising a metal salt.

7. The process according to claim 1, characterized in that the hydrodeoxygenation is carried out under a hydrogen pressure ranging from 1 to 15 MPa at a temperature ranging from 150 to 350° C.

8. The process according to claim 1, characterized in that the hydrodeoxygenation catalyst contains at least one component selected from the group consisting of metals of the Group VIII and metals of Group VIA of the periodic system of the elements on a support.

9. The process according to claim 8 wherein the catalyst contains Pd, Pt, Rh, Ru, Ni, Ni and Mo, or Co and Mo metals on activated carbon, alumina and/or silica supports.

10. The process according to claim 1, characterized in that the hydroisomerization is performed under hydrogen pressure ranging from 1 to 15 MPa at a temperature ranging from 200 to 400° C.

11. The process according to claim 1, characterized in that the hydroisomerization catalyst contains a metal of the Group VIII of the periodic system of the elements, a molecular sieve and/or a support, the support being alumina and/or silica.

12. The process according to claim 11 wherein said catalyst contains a molecular sieve and a Pd, Pt or Ni metal and/or a support, the support being alumina and/or silica.

13. The process according to claim 1, characterized in that prior to the condensation step, prehydrogenation is carried out under a hydrogen pressure between 0.1 and 20 MPa and at a temperature between 50 and 400° C. in the presence of a hydrogenation catalyst.

14. The process according to claim 13, characterized in that the hydrogenation catalyst contains supported metals of the Group VIII and/or VIA of the periodic system of the elements.

15. The process according to claim 14, wherein said hydrogenation catalyst contains a supported Pd—, Pt—, Rh—, Ru—, Ni—, Cu—, Cu and Cr—, Ni and Mo— or Co and Mo-catalyst, the support being activated carbon, alumina and/or silica.

16. The process according to claim 1, characterized in that a hydrocarbon or a mixture of hydrocarbons is added to the feedstock and/or as a diluent to process steps.

17. The process according to claim 1, characterized in that diesel components and gasoline components are produced as by-products.

* * * * *